(12) United States Patent
Woodring et al.

(10) Patent No.: US 6,519,686 B2
(45) Date of Patent: Feb. 11, 2003

(54) INFORMATION STREAMING IN A MULTI-PROCESS SYSTEM USING SHARED MEMORY

(75) Inventors: Michael C. Woodring, Hillsboro, OR (US); Aaron M. Cohen, Beaverton, OR (US); Rama Menon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,770

(22) Filed: Jan. 5, 1998

(65) Prior Publication Data

US 2001/0003193 A1 Jun. 7, 2001

(51) Int. Cl.[7] ............................................... G06F 12/00
(52) U.S. Cl. ..................... 711/147; 711/150; 709/312; 709/310; 709/318
(58) Field of Search ................................. 711/147, 152, 711/153; 707/1; 709/200, 201, 202, 203, 213, 216, 231, 310, 312–318; 710/52, 53, 54, 56

(56) References Cited

U.S. PATENT DOCUMENTS

| | | | | |
|---|---|---|---|---|
| 4,841,574 A | * | 6/1989 | Pham et al. .................... 381/31 |
| 4,914,653 A | * | 4/1990 | Bishop et al. ............... 370/85.6 |
| 5,142,683 A | * | 8/1992 | Burkhardt, Jr. et al. ..... 395/725 |
| 5,224,212 A | * | 6/1993 | Rosenthal et al. ........... 395/250 |
| 5,241,664 A | * | 8/1993 | Ohba et al. .................. 395/425 |
| 5,341,476 A | * | 8/1994 | Lowell ......................... 395/200 |
| 5,357,612 A | * | 10/1994 | Alaiwan ....................... 395/200 |
| 5,384,890 A | * | 1/1995 | Anderson et al. ............... 395/2 |
| 5,469,549 A | * | 11/1995 | Simpson et al. ........ 395/200.08 |
| 5,550,982 A | * | 8/1996 | Long et al. ............. 395/200.13 |
| 5,561,637 A | * | 10/1996 | Dan et al. ............... 365/230.03 |
| 5,696,940 A | * | 12/1997 | Liu et al. ..................... 395/841 |
| 5,717,954 A | * | 2/1998 | Grieff et al. ................. 395/877 |
| 5,724,543 A | * | 3/1998 | Ozden et al. ................ 395/441 |
| 5,740,467 A | * | 4/1998 | Chmielecki, Jr. et al. ... 395/876 |
| 5,760,823 A | * | 6/1998 | Brunson et al. ............... 348/14 |
| 5,790,790 A | * | 8/1998 | Smith et al. ........... 395/200.36 |
| 5,859,979 A | * | 1/1999 | Tung et al. ............ 395/200.58 |
| 5,867,653 A | * | 2/1999 | Aras et al. ............. 395/200.34 |
| 5,867,734 A | * | 2/1999 | Drews ......................... 395/872 |
| 5,873,089 A | * | 2/1999 | Regache ...................... 707/100 |
| 5,905,871 A | * | 5/1999 | Buskens et al. ....... 395/200.75 |
| 5,916,309 A | * | 6/1999 | Brown et al. ................. 710/52 |
| 5,928,330 A | * | 7/1999 | Goetz et al. ................. 709/231 |
| 5,930,473 A | * | 7/1999 | Teng ..................... 395/200.34 |
| 5,931,925 A | * | 8/1999 | McNabb et al. .............. 710/52 |
| 5,949,784 A | * | 9/1999 | Sodder ........................ 370/397 |
| 5,956,321 A | * | 9/1999 | Yao et al. .................... 370/230 |
| 5,956,342 A | * | 9/1999 | Manning ..................... 370/414 |
| 5,959,536 A | * | 9/1999 | Chambers et al. .......... 340/636 |
| 5,995,594 A | * | 11/1999 | Shaffer et al. ............ 379/88.12 |
| 6,012,084 A | * | 1/2000 | Fielding et al. ............. 709/205 |
| 6,018,766 A | * | 1/2000 | Samuel et al. .............. 709/218 |
| 6,038,592 A | * | 3/2000 | Verplanken et al. ........ 709/215 |
| 6,038,621 A | * | 3/2000 | Gale et al. .................... 710/56 |
| 6,047,280 A | * | 4/2000 | Ashby et al. ................... 707/2 |
| 6,161,137 A | * | 12/2000 | Ogdon et al. ................ 709/224 |

* cited by examiner

*Primary Examiner*—Do Hyun Yoo
*Assistant Examiner*—Kimberly N McLean
(74) *Attorney, Agent, or Firm*—Blakely, Sokoloff, Taylor & Zafman LLP

(57) ABSTRACT

The present invention discloses a method and system for streaming an information stream from a producer to N consumers in a multi-process environment. An inter-process communication (IPC) channel containing a shared memory is provided between the producer and at least one of N consumers. The information stream is written into the shared memory by way of a producer-side interface. The information stream is read from the shared memory by way of a consumer-side interface.

30 Claims, 5 Drawing Sheets

INFORMATION STREAMING IN A MULTI-PROCESS SYSTEM USING SHARED MEMORY

BACKGROUND OF THE INVENTION

1. Field of the Invention

This invention relates to information systems. In particular, the invention relates to multimedia information streaming in a multi-process environment.

2. Description of Related Art

A typical multimedia application such as video conferencing involves a large amount of information including video, audio, and data, that need to be processed in a timely manner. With the proliferation of personal computer (PC) hardware and software technologies, more and more multimedia applications are implemented on the PC platform supported by multi-process operating systems. A multi-process operating system (OS) supports concurrent and asynchronous processes. Modern operating systems allow concurrent execution of multiple processes on multiple CPU's, substantially increasing system performance.

In dealing with multiple processes, the OS has to maintain the integrity of each process. Robustness and security are two most important issues in multi-process OS. However, in providing robustness and security, the OS may have to compromise the performance in terms of efficient utilization of resources (e.g., memory) and processing time. One important problem in dealing with concurrent and asynchronous processes is the interprocess communication (IPC). One common type of IPC is the producer-consumer relationship. In this relationship, one process, a producer, generates information to be used or received by one or more other processes, a consumer process.

In a multi-process operating system, a process defines a virtual address space within which an application's code and data reside. The operating system (OS) maintains a private address space for each application that is unique and protected from other applications. Although this architecture is useful for security purposes, it makes it difficult to share data between address spaces. In a typical producer-consumer relationship, this limitation implies that the producer has to have the operating system replicate the information before sending to each consumer. For multimedia applications, the replication of information is undesirable because of the amount of data involved.

In multimedia applications, the process boundaries between the producer and consumer are particularly relevant. For example, a video conference typically involves the transfer of information from one computer to several other computers via a network. It is not uncommon for a producer to generate several video frames per second, at several hundred kilobytes per frame. These video frames are typically processed by multiple consumers. One consumer displays the captured video to the screen while another consumer compresses the video frames and transmits them to the other computers in the video conference over the network. If the video conference was being recorded for future reference, a third consumer of these video frames might be responsible for saving a copy of the video frames to a disk drive or other non-volatile storage medium.

Accordingly, there is a need in the technology to provide an efficient information streaming of multimedia information in a multi-process software environment.

SUMMARY OF THE INVENTION

The present invention discloses a method and system for streaming an information stream from a producer to N consumers in a multi-process environment. An inter-process communication (IPC) channel containing a shared memory is provided between the producer and at least one of N consumers. The information stream is written into the shared memory by way of a producer-side interface. The information stream is read from the shared memory by way of a consumer-side interface.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and system for efficient information streaming in a multi-process environment. The method provides a shared memory mechanism to avoid replication of data. This shared memory mechanism is supported by a well organized and structured interfaces between the producers and consumers via an interprocess communication channel. The result is an efficient streaming of multimedia information.

In the following description, for purposes of explanation, numerous details are set forth in order to provide a thorough understanding of the present invention. However, it will be apparent to one skilled in the art that these specific details are not required in order to practice the present invention. In other instances, well known computer software structures and hardware circuits are shown in block diagram form in order not to obscure the present invention unnecessarily.

Figure 1:
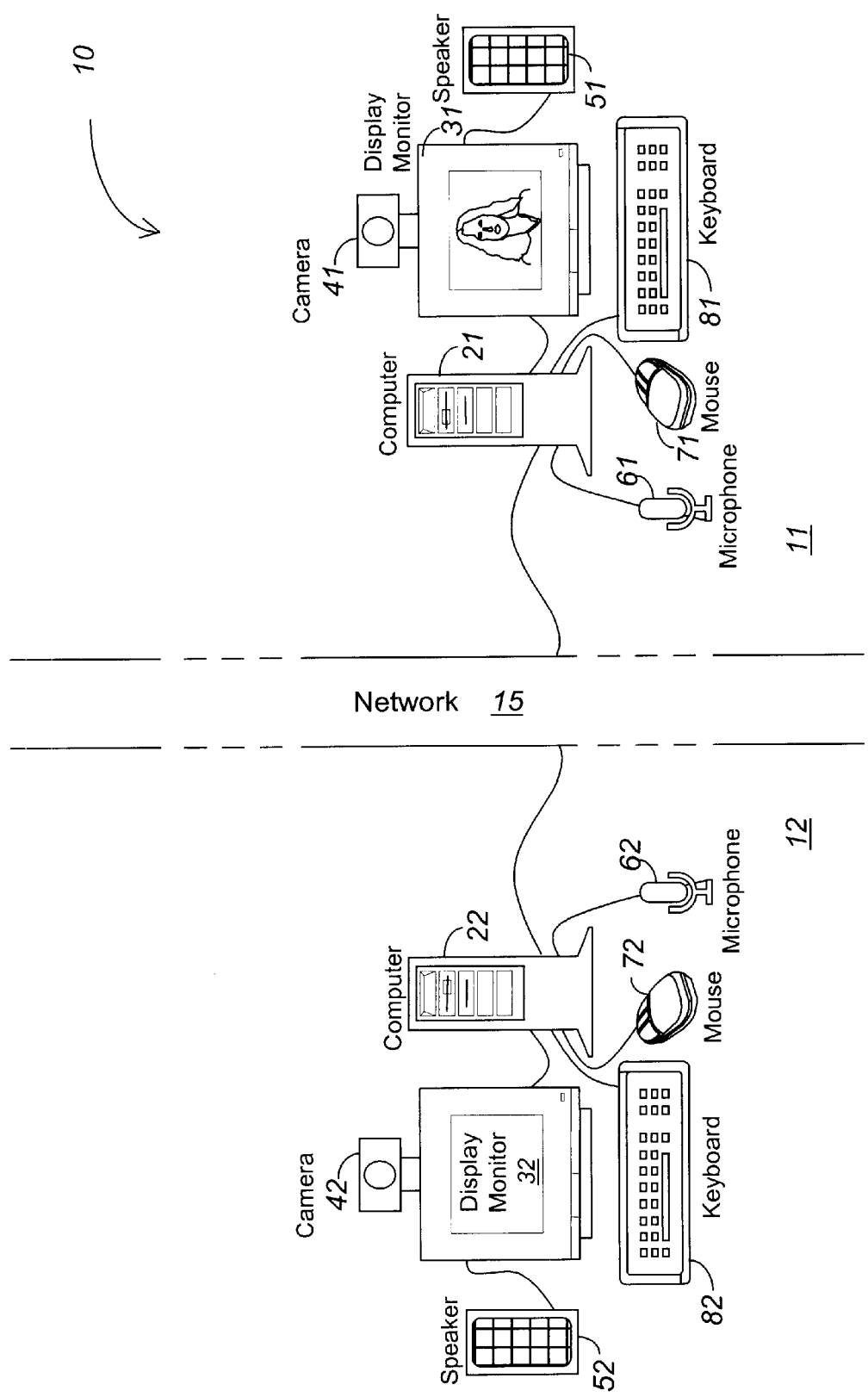
FIG. 1 is a block diagram illustrating one embodiment of a system in accordance with the teachings of the present invention.

Referring to FIG. 1, an illustrative embodiment of a network system 10 in accordance with the teachings of the present invention is shown. The system 10 comprises a first station 11 and a second station 12 connected via a network 15. It will be appreciated that the system 10 may include more than two stations. For illustrative purposes, only two stations are shown. Furthermore, although the following description is presented in the context of a video conference application, the present invention can be utilized in any other applications that involves information streaming on a multi-process environment.

The two stations 11 and 12 are located on two sides of the video conference network 15. Each station is capable of transmitting and receiving information to and from the other station. The network 15 is any communication network that provides the medium for transmission of data. Examples of the network 15 include telephone lines, fiber optics connection, and Internet. The first station 11 comprises a first computer 21, a first display monitor 31, a first video camera 41, a first speaker 51, a first microphone 61, a first mouse 71, and a first keyboard 81. Similarly, the second station 12 comprises a second computer 22, a second display monitor 32, a second video camera 42, a second speaker 52, a second microphone 62, a second mouse 72, and a second keyboard 82.

Computers 21 and 22 are any computer systems that employ multiprocess operating systems. Examples of multi-process operating systems are Windows 95® and Windows NT®. In one embodiment, computers 21 and 22 are systems utilizing the Pentium® microprocessors manufactured by Ititel Corporation at Santa Clara, Calif.

Display monitors 31 and 32 are any display monitors that can display graphics or image data from graphic controllers. Display monitors 31 and 32 are capable of displaying medium to high resolution color images. Typical image resolutions are 1024×768, and 1280×1024 at 16-bits or 24-bits per pixel.

Video cameras 41 and 42 comprise image sensors and circuitry to convert light-sensitive responses from sensing elements to electrical signals. In one embodiment, video cameras 41 and 42 are color charged coupled devices (CCD) cameras. Video cameras 41 and 42 are used to obtain real-time images of video conference participants and any other objects (e.g., documents, drawings). The video images are captured and digitized by image capture boards in computer systems 21 and 22. The digitized image data are processed, compressed if necessary, and transmitted from one station to the other via the network 15.

Speakers 51 and 52 provide audible sound from audio data provided by computer systems 21 and 22, respectively. Microphones 61 and 62 receive sound from video conference participants and convert to electrical audio signals. The audio signals are converted into digital sound data by audio sound cards in computer systems 21 and 22. The digital audio data are processed, compressed if necessary, and transmitted over the network 15 along with the video data.

Mice 71 and 72 and keyboards 81 and 82 are any mice and keyboard devices that allow the users to input data to the computer systems 21 and 22, respectively.

The two stations 11 and 12 exchange information over the network 15. Within each station, the computer systems 21 and 22 operates to maintain efficient information streaming to provide optimal allocation of storage and processing speed.

Figure 2:
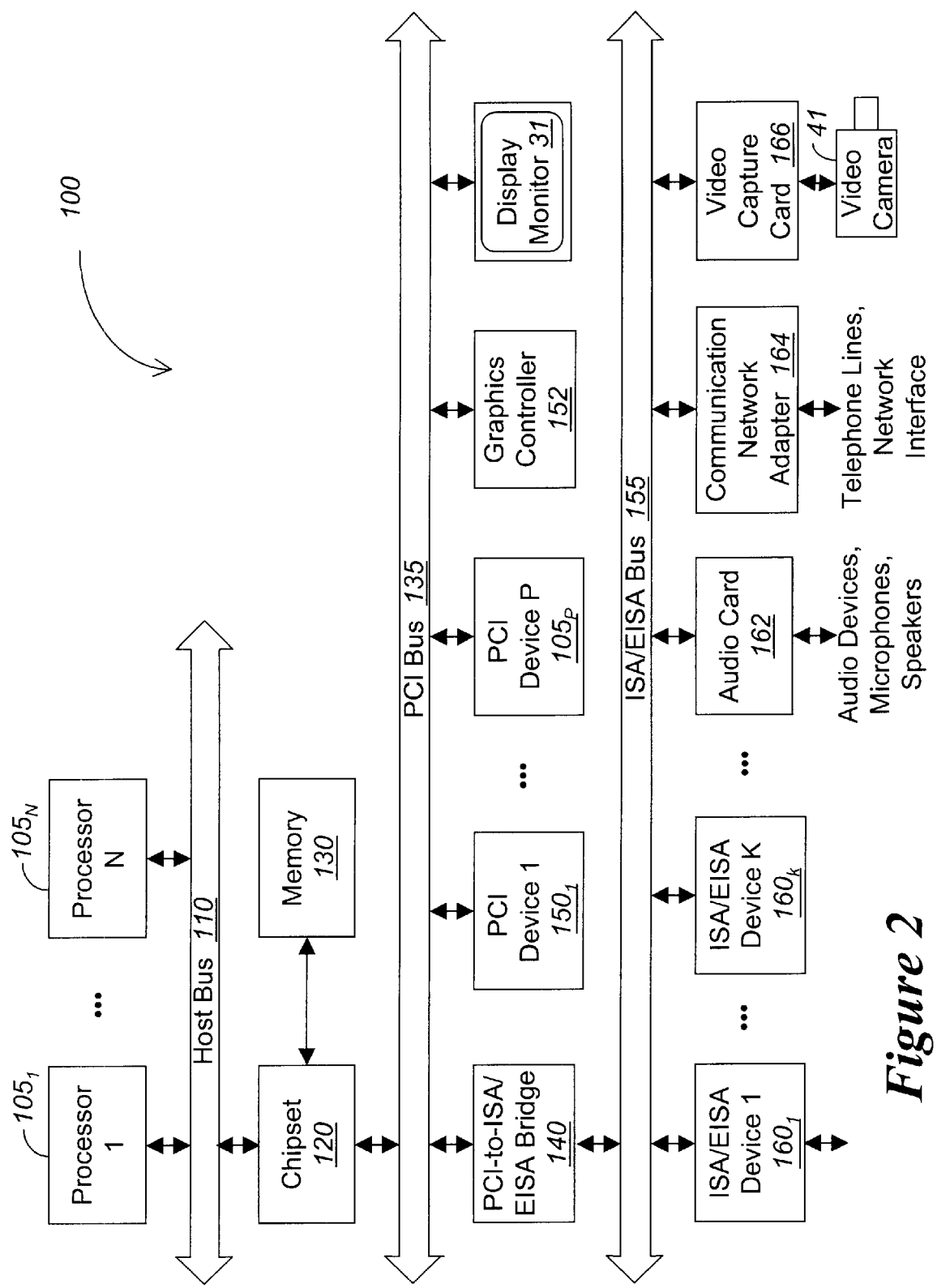
FIG. 2 is a diagram illustrating one embodiment of the producer-consumer in a typical video conferencing application.

Referring to FIG. 2, an illustrative embodiment of a computer system 21 that operates in accordance with the teachings of the present invention is shown. For ease of explanation, computer system 22 is assumed to be substantially similar to computer system 21. However, the present invention may be practiced with dissimilar computer systems. The computer system 21 comprises one or more processors $105_1$–$105_N$ ("N" being a positive whole number) and a main memory element 130 (e.g., dynamic random access memory "DRAM", static random access memory "SRAM"etc.) coupled together by a host bus 110 and a chipset 120. In one embodiment, the chipset 120 is a host-to-PCI bridge which operates as an interface between a host bus 110 and a peripheral bus 135. The main memory 130 also includes a non-volatile memory or separately powered memory (e.g., DRAM, SRAM) for saving contents of registers or other memories when power is removed.

Processors $105_1$–$105_N$ are preferably microprocessors that are capable of handling a pipelined and/or parallel bus. In one embodiment, processors $105_1$–$105_N$ are the Pentium® processors manufactured by Intel Corporation of Santa Clara, Calif.

Chipset 120 typically includes a cache DRAM controller (CDC), a peripheral bus controller, and a data path unit (DPU). The peripheral bus 135 is a Peripheral Component Interconnect (PCI) bus. Other bus architecture may be employed. The chipset or Host-to-PCI Bridge 120 provides a set of host-to-PCI and PCI-to-host bus transaction translations.

The host bus 110 is a bus that can support transactions to a number of coupled processors. Host bus 110 may be referred to as a parallel bus or multiprocessor bus because it supports parallel operations and multiple processors. It is contemplated that host bust 110 operates in a pipelined manner to increase efficiency. However, these features should not be construed to limit the teachings of the present invention.

The PCI bus 135 provides a communication path between the processors $105_1$–$105_N$ or main memory element 130 and a plurality of peripheral devices $150_1$–$150_P$ ("P" being a positive whole number) and a graphics controller card 152. The peripheral devices $150_1$–$150_P$ may include I/O devices such as disk controller, and peripheral components such as DMA controllers, interrupt controllers, and timers. The graphic controller card 152 processes the graphic and image data for displaying on the video monitor 31.

The PCI-to-ISA Bridge 140 provides the communication path between the peripheral or PCI bus 135 and the expansion or ISA/EISA bus 155.

The expansion bus 155 may comprise an Industry Standard Architecture (ISA) bus or an Extended Industry Standard Architecture (EISA) bus. The ISA/EISA bus 155 provides a communication path between the peripheral PCI bus 135 and a plurality of expansion ISA/EISA peripheral devices $160_1$–$160_K$ ("K"being a positive whole number), an audio card 162, a communication network adapter 164, and a video capture card 166. The expansion ISA/EISA peripheral devices $160_1$–$160_K$ may include any suitable devices such as serial communication interface and programmable timers. The audio card 162 includes circuitry to perform audio signal processing. In one embodiment, the audio card 162 is attached to the PCI bus 135. The audio card 162 is interfaced to a number of audio devices such as microphone, cassette or Compact Disk (CD) player, headphones, stereo amplifier, speakers, and joystick musical instrument digital interface (MIDI) connector. The communication network adapter 164 provides the communication interface to the telephone lines or other network channels. The video capture card 166 digitizes the video signal from the video camera 41 in real-time and provides the image data for transmission. In one embodiment, the audio card 162 and the video capture card 166 are combined in a audio/video card.

One or more of processors $105_1$–$105_N$ executes the information streaming program stored in memory 130 to provide efficient data streaming in a multi-process operating system. It is contemplated that the computer system 21 is supported by a multi-process operating system such as the Windows 95® and Windows NT®.

Figure 3:
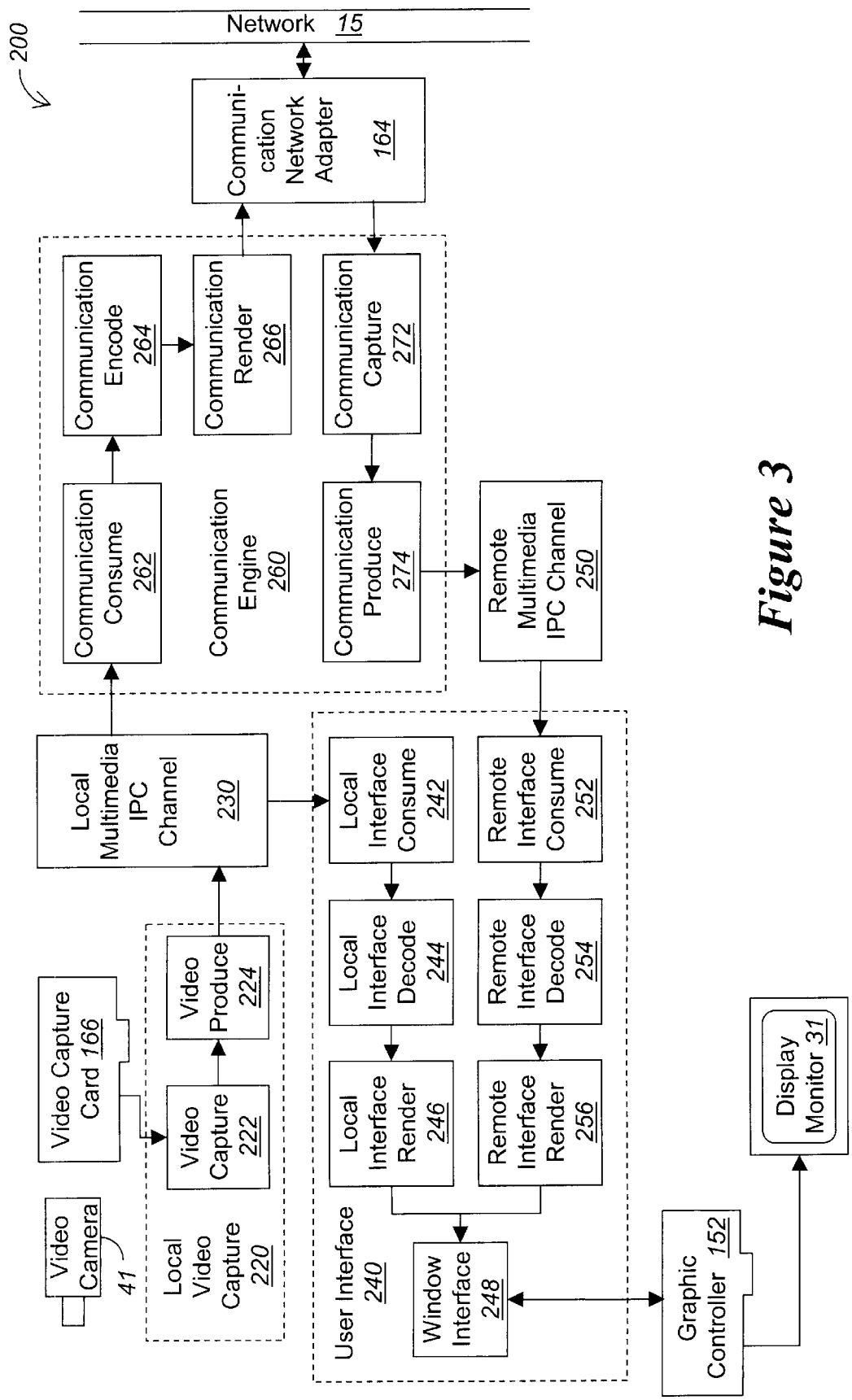
FIG. 3 is a diagram illustrating one embodiment of the overall architecture.

Referring to FIG. 3, a diagram illustrating one embodiment of the software architecture 200 in accordance with the teachings of the present invention is shown. The software architecture 200 comprises a local video capture 220, a local multimedia Inter-Process Communication (IPC) channel 230, a user interface 240, a remote multimedia IPC channel 250, and a communication engine 260.

The local video capture 220 provides the video interface at the conference site. The local video capture 220 interfaces with the video capture card 166 which digitizes the video signal from the video camera 41. The local video capture 220 comprises a capture module 222 and a video produce module 224. The capture module 222 acquires the digital image data from the video capture card 166 and performs front-end processing operations on the image data. The video produce module 224 receives, organizes, formats, and transmits the image data stream from the capture module 222 to the local multimedia IPC channel 230.

The local multimedia IPC channel 230 performs the data streaming of the video information to the user interface 240 and the communication engine 260. It is contemplated that the local multimedia IPC channel also performs streaming on other types of multimedia information such as audio and data.

The user interface 240 receives, decodes, and renders the information streams from the local and remote multimedia IPC channels 230 and 250. The user interface 240 comprises a local interface consume 242, a local interface decode 244, a local interface render 246, a remote interface consume 252, a remote interface decode 254, a remote interface render 256, and a window interface 248.

The local interface consume 242 receives, formats, and organizes the information stream from the local multimedia IPC channel 230. The local interface decode 244 decodes the information stream processed by the local interface consume 242. The decoding may include operations such as decompression and filtering. The local interface render 246 obtains the decoded multimedia data and writes to appropriate buffers for local display by the window interface 248. The remote interface consume 252 receives, formats, and organizes the information stream from the remote multimedia IPC channel 250. The remote interface decode 254 decodes the information stream processed by the remote interface consume 252. The decoding may include operations such as decompression and filtering. The remote interface render 256 obtains the decoded multimedia data and writes to appropriate buffers for local display by the window interface 248. The window interface 248 provides the graphical user interface to the information stored in buffers allocated for local and remote channels. The window interface 248 also processes the local interface operations for displaying on the local display monitor. The window interface 248 provides display data to the graphic controller 152 which in turns generates graphic, image, and textual data to be displayed on the display monitor 31.

The communication engine 260 provides the communication interface to the network 15 that connects to other stations in the conference network. The communication engine 260 comprises a communication consume 262, a communication encode 264, a communication render 266, a communication capture 272, and a communication produce 274.

The communication consume 262 receives the information stream from the local multimedia IPC channel 230. The communication encode 264 encodes the information stream. Examples of the encoding operations include compression, filtering, motion estimation, motion vector computation. The communication render 266 receives the encoded information stream and writes to the appropriate buffer on the communication network adapter 164. The encoded information stream is then transmitted over the network 15 to other remote terminals or stations. The communication capture 272 receives the encoded information stream from the communication network adapter 164 which receives the information from the network 15 sent by other remote terminals or stations. The communication produce 274 obtains the encoded information stream from the communication capture 272 and sends to the remote multimedia IPC channel 250.

The remote multimedia IPC channel 250 performs the data streaming of the multimedia information to the user interface 240.

It should be noted that the local and remote multimedia stream channels may have 1, 2, or many simultaneous consumers (clients) for their data, and are not limited to the number of clients shown in FIG. 3.

Figure 4:
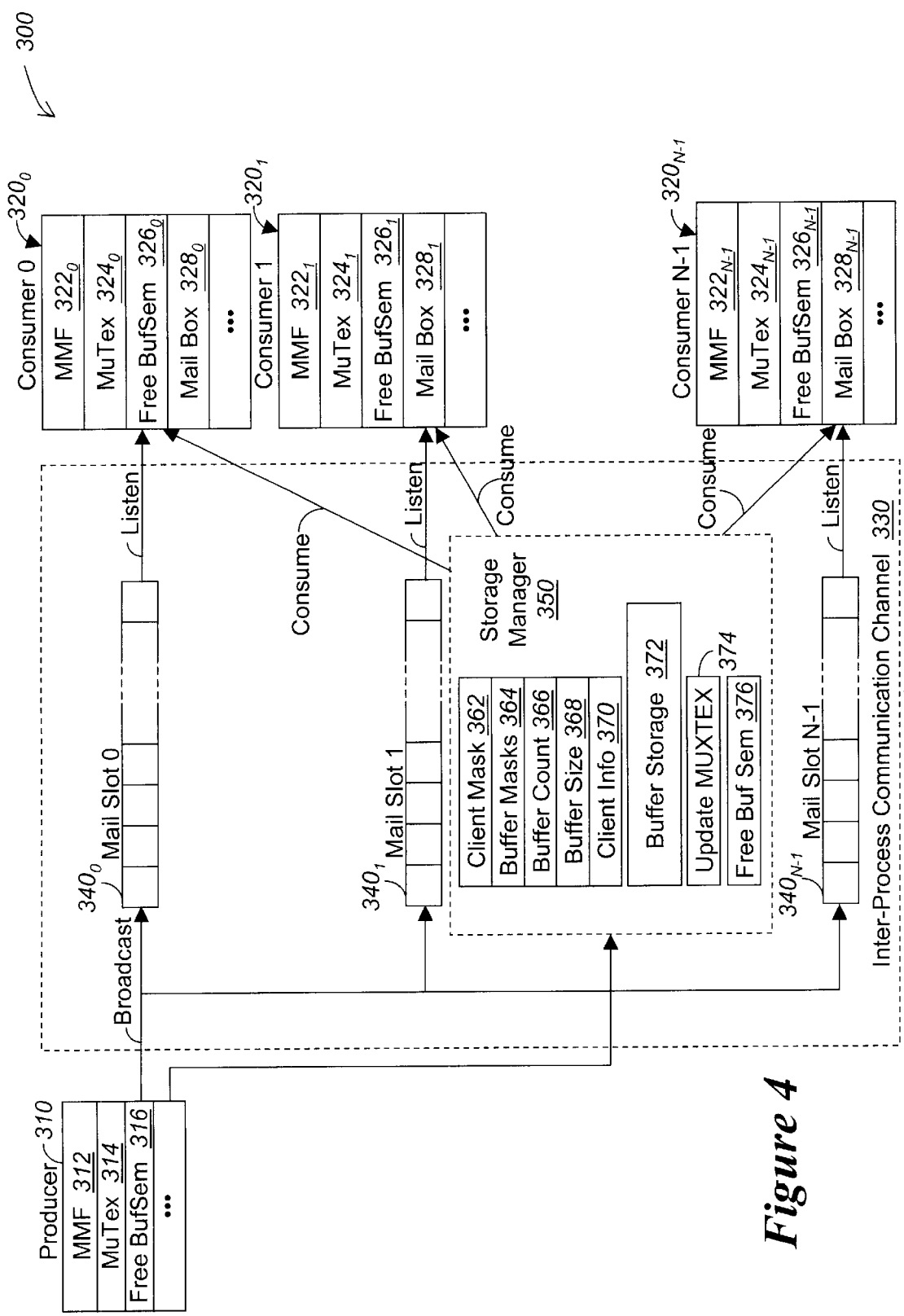
FIG. 4 is a diagram illustrating one embodiment of the IPC channel.

Referring to FIG. 4, a diagram illustrating one embodiment of the IPC channel system architecture 300 is shown. As will be appreciated by persons skilled in the art, the IPC channel system architecture 300 is generic to any producer-consumer relationship, whether it is local or remote. The IPC channel system architecture 300 comprises a producer 310, N consumers $320_0$ through $320_{N-1}$, and the IPC channel 330. The IPC channel 330 supports the producer 310 and N consumer threads $320_0$ through $320_{N-1}$. These threads may reside in the same or different processes.

The producer 310 is a process that generates an information stream to be received by one or more consumers. The producer 310 employs a number of software mechanisms to facilitate the synchronization, management, and processing of the information stream between the producer 310 and the consumers $310_0$ through $320_{N-1}$. These software mechanisms include a producer memory mapped file (MMF) handler 312, a producer mutual exclusion (MUTEX) mechanism 314, and a producer free buffer semaphore (FBSEM) mechanism 316. In one embodiment, these MMF, MUTEX, and FBSEM mechanisms are implemented as handles, or references, to the corresponding objects. The objects (e.g., memory mapped file, mutual exclusion, semaphore) are shared by all consumers and the producer.

The producer MMF handler 312 is employed to access a shared memory files or data provided for multiple consumers. The producer MMF handler 312 eliminates the need of duplicating the data for transmission to the consumers. When there is a large amount of multimedia information to be transmitted to the consumers such as local video display, local video record, and local video encode/transmit, duplicating the video data is prohibitively expensive. The producer MMF handler 312 also provides shared memory accesses to all consumers $320_0$ through $320_{N-1}$. With this shared memory mechanism, a significant amount of memory is saved. In addition, the processor cycles are not wasted in copy operations resulting in significant saving in processor cycles and processing time. This is especially significant at the system level because the processor is usually much faster than the main memory and cache coherency, purge, and refresh issues add further to the wasted time.

The producer MUTEX mechanism 314 avoids the problem of conflicting accesses to the shared memory by multiple processes. The producer MUTEX mechanism 314 ensures that when a process accesses the shared memory that contains the information stream common to all consumers, other processes will be prevented from entering the shared memory.

The producer FBSEM mechanism 316 keeps track of the free buffers and informs the producer about the availability of the buffers. The producer FBSEM mechanism 316 permits a process to access a buffer memory if the buffer memory's semaphore has been unblocked.

The IPC channel 330 acts as an efficient conduit to streamline the information from the producer 310 to the consumers $320_0$ through $320_{N-1}$. The IPC channel 330 performs this efficient data streaming employing two separate mechanisms: the mail slots $340_0$ through $340_{N-1}$ and storage manager 350.

The mail slots $340_0$ through $340_{N-1}$ are used to facilitate notification of the consumers $320_0$ through $320_{N-1}$, respectively, of the arrival of the information stream. The mail slots $340_0$ through $340_{N-1}$ are correspondingly broadcast to the consumers $320_0$ through $320_{N-1}$, respectively. Each mail slot is implemented as a first-in-first-out (FIFO) ordered queue accessible to the corresponding consumer. Each consumer can request a sample notification rate different than other consumers. Each consumer, therefore, maintains its own mail slot to determine if the information stream has arrived. A mail slot contains an index which represents the location of the information stream stored in the storage manager 350. When multiple consumers receive a notification that the information stream has arrived, they all map the buffer pointer to the buffer into their address space and read the data out of the buffer simultaneously without holding any memory locks on the buffer storage while reading the data, and without incurring any copies.

The storage manager 350 stores the management data structure and the information stream that is sent to the consumers $320_0$ through $320_{N-1}$. The storage manager 350 is located in the shared memory accessible to all consumers. The storage manager 350 comprises a client mask 362, a buffer mask 364, a buffer count 366, a buffer size 368, a client information 370, a buffer storage 372, an update MUTEX mechanism 374, and an IPC free buffer semaphore (IPC FBSEM) mechanism 376. In one embodiment, these MMF, MUTEX, and FBSEM mechanisms are implemented as handles, or references, to the corresponding objects. The objects (e.g., memory mapped file, mutual exclusion, semaphore) are shared by all consumers and the producer.

The buffer count 366 contains a variable indicating the number of buffers in the buffer storage area 372. The buffer size 368 indicates the size in bytes of each buffer in the buffer storage area 372. The client information 370 contains information about each consumer such as their unique process identification (ID) and desired sample notification rate. The buffer storage 372 stores the actual information stream that is to be accessed by the client consumers. The buffer storage 372 may contain a block of video data, a segment of audio, a block of text data, or any other data being transferred between the producer and the consumers. The client mask 362 represents a bitmask indicating which clients have connected to the IPC channel. Each client is identified by one bit position in this bitmask. The buffer mask 364 represents an array of buffer masks associated with each buffer in the buffer storage 372. Each buffer mask is a bitmask indicating which client or clients has a reference to the given buffer. A buffer mask of zero indicates no clients have a reference on the specified buffer, and the buffer is therefore available to the producer for further use.

The update MUTEX mechanism 374 provides mutually exclusive access by the producer and all consumers to the management data structures with the exception of the buffer storage area. In other words, if the producer, or any consumer, needs to read or update the buffer masks, client mask, or client information data structures, they must first acquire exclusive ownership of the MUTEX 374. The MUTEX 374 is specifically not owned which accessing the data in the buffer storage 372.

The free buffer semaphore, FBSEM mechanism 376, is used signal to the producer that one or more buffers in the buffer storage 372 are free and available for further use. When no buffers are available, the producer thread is blocked on the FBSEM mechanism 376. Each time a client process releases a reference to a buffer, it clears its client bit from the buffer mask 364. If the buffer mask 364 becomes zero at this time, indicating the given buffer is now available, the client thread signals the FBSEM mechanism 376. By not requiring any locks to be held by the consumers while they are reading and processing the data in the buffer storage 372, significant performance improvements are achieved.

The consumers $0$ through $N-1$ $320_0$ through $320_{N-1}$ listen to the broadcast mail slots to wait for the arrival of the information stream. Each consumer has its own mail slot assigned to its separate address space. The monitoring of the mail slot is, therefore, carried out separately by different consumers. Each consumer $320_i$ (where $i=0, \ldots, N-1$) comprises a consumer MMF handler $322_i$, a consumer MUTEX mechanism $324_i$, a consumer FBSEM mechanism $326_i$, and a mailbox $328_i$. The consumer MMF handler $322_i$, MUTEX mechanism $324_i$, and FBSEM mechanism $326_i$ essentially perform similar tasks as the producer MMF handler 312, producer MUTEX mechanism 314, and producer FBSEM mechanism 316 except that the interface is for the consumer side. In one embodiment, these MMF, MUTEX, and FBSEM mechanisms are implemented as handles, or references, to the corresponding objects. The objects (e.g., memory mapped file, mutual exclusion, semaphore) are shared by all consumers and the producer.

The mailbox $328_i$ maintains the status of the mail slot $340_i$. The mailbox $328_i$ also allows the consumer $320_i$ to specify the sample notification rate to be streamed into the buffer area 350. The sample notification rate can be any fraction of the sample notification rate generated by the producer. It is essentially the number of times a consumer is notified per a unit time period.

Figure 5:
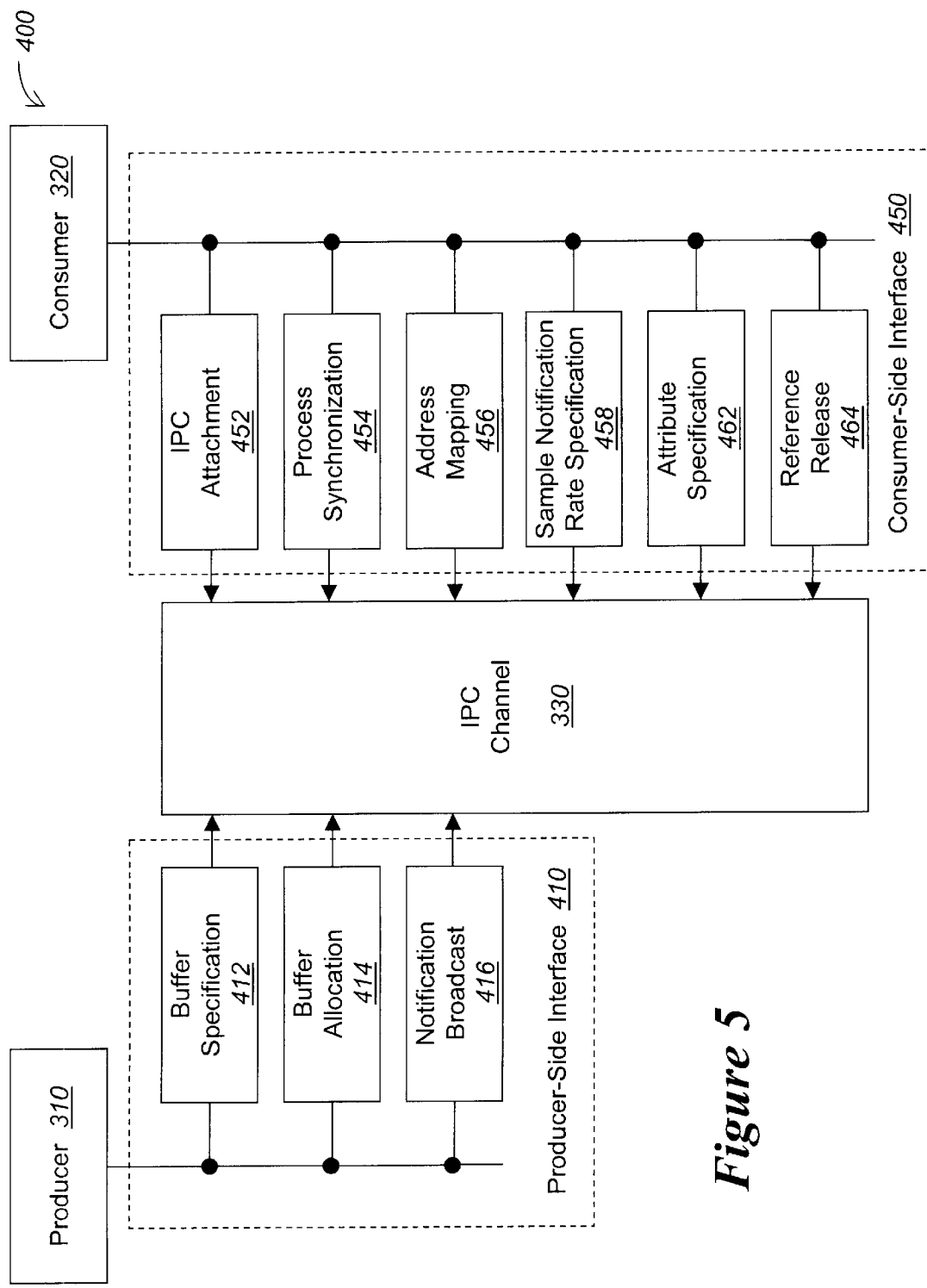
FIG. 5 is a diagram illustrating one embodiment of the interface architecture between the IPC channel and the producer and the consumers.

Referring to FIG. 5, a diagram illustrating the interface architecture 400 is shown. Interface architecture 400 comprises a producer-side interface 410 and the consumer-side interface 450.

The producer-side interface 410 provides the interface between the producer 310 and the IPC channel 330. The producer-side interface 410 includes a buffer specification 412, a buffer allocation 414, and a notification broadcast 416.

The buffer specification 412 specifies the number (buffer count) and the individual size of the buffers within the shared memory in the buffer area 350. The buffer allocation 414 reserves an individual buffer and prepares that buffer to be written into. The notification broadcast 416 broadcasts a notification of a new buffer to any actively attached client processes. In addition, a reference is made in the buffer area 350 to indicate which client(s) intend(s) to consume the data within that buffer.

The consumer-side interface 450 includes an IPC attachment 452, a process synchronization 454, an address mapping 456, a sample notification rate specification 458, an attribute specification 462, and a reference release 464.

The IPC attachment 452 allows the consumer to attach to the IPC channel 330 to receive the corresponding broadcast mail slot. The attachment allows the consumer to begin receive information stream. The process synchronization 454 allows a thread to wait until a buffer has been broadcast by the producer thread. A client that is notified of a buffer being placed in the channel is said to hold a reference on that buffer. The address mapping 456 maps the buffer's address into the client process address space. The sample notification rate specification 458 specifies a desired sample rate at which to be notified of buffers being streamed in order to voluntarily reduce the amount of data being streamed to that client's process. The attribute specification 462 specifies a key attribute of the information stream (e.g., video resolution) that is use to match before sending out a buffer notification. The reference release 464 releases a reference to a buffer back to the IPC channel. When no more clients hold a reference to a buffer, that buffer is considered available to the producer thread for further streaming.

The present invention thus discloses a method and an architecture that provides efficient information streaming in a multi-process environment by creating an IPC channel which supports shared memory. The present invention saves storage area and improve the response rate.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    sharing an information stream in a shared memory located in an inter-process communication (IPC) channel between a producer and at least one of N consumers, the IPC channel having a client mask to represent a bitmask indicating which consumer from the N consumers is being connected;
    generating the information stream into the shared memory by a producer-side interface, the producer-side interface interfacing between the producer and the IPC channel;
    notifying a consumer-side interface of arrival of the information stream via at least one of N mail slots, the consumer-side interface interfacing between the at least one of the N consumers and the IPC channel; and
    receiving the information stream from the shared memory by the consumer-side interface.

2. The method of claim 1 wherein generating the information stream comprises specifying a number of buffers and a buffer size to be used in the shared memory.

3. The method of claim 1 wherein generating the information stream comprises allocating a buffer for writing.

4. The method of claim 1 wherein notifying the consumer-side interface of the arrival of the information stream comprises broadcasting a notification to the N consumers.

5. The method of claim 1 wherein receiving the information stream comprises attaching the at least one of the N consumers to the IPC channel.

6. The method of claim 1 wherein receiving the information stream comprises waiting until a buffer is broadcast.

7. The method of claim 1 wherein receiving the information stream comprises mapping a buffer's address into an address space of the at least one of the N consumers.

8. The method of claim 1 wherein receiving the information stream comprises specifying a desired sample notification rate at which to be notified of a buffer arrival.

9. The method of claim 1 wherein receiving the information stream comprises specifying a key attribute of the information stream for matching before notification.

10. The method of claim 1 wherein receiving the information stream comprises releasing a reference to a buffer.

11. A system comprising:
    a shared memory to share an information stream from a producer to N consumers, the shared memory being located in an inter-process communication (IPC) channel between the producer and at least one of the N consumers, the IPC having at least one mail slot, the IPC channel having a client mask to represent a bitmask indicating which consumer of the N consumers is being connected;
    a producer-side interface coupled to the IPC channel and the producer for generating the information stream into the shared memory; and
    a consumer-side interface coupled to the IPC channel and the at least one of the N consumers for receiving the information stream from the shared memory upon being notified, by the at least one mail slot of arrival of the information stream.

12. The system of claim 11 wherein the producer-side interface comprises a buffer specifier for specifying a number of buffers and a buffer size to be used in the shared memory.

13. The system of claim 11 wherein the producer-side interface comprises a buffer allocator for allocating a buffer for writing.

14. The system of claim 11 wherein the at least one mail slot broadcasts a notification to the at least one of the N consumers.

15. The system of claim 11 wherein the consumer-side interface comprises an IPC attachment for attaching the at least one of the N consumers to the IPC channel.

16. The system of claim 11 wherein the consumer-side interface comprises a synchronizer for waiting until a buffer is broadcast.

17. The system of claim 11 wherein the consumer-side interface comprises an address mapper for mapping a buffer's address into an address space of the at least one of the N consumers.

18. The system of claim 11 wherein the consumer-side interface comprises a sample notification rate specifier for specifying a desired sample notification rate at which to be notified of a buffer arrival.

19. The system of claim 11 wherein the consumer-side interface comprises an attribute specifier for specifying a key attribute of the information stream for matching before notification.

20. The system of claim 11 wherein the consumer-side interface comprises a reference releaser for releasing a reference to a buffer.

21. A computer program product comprising:
    a computer usable medium having computer program code embodied therein for streaming an information stream from a producer to N consumers the computer program product having:
        computer readable program code for sharing the information stream in a shared memory located in an inter-process communication (IPC) channel between the producer and at least one of the N consumers, the IPC channel having a client mask to represent a bitmask indicating which consumer of the N consumers is being connected;
        computer readable program code for generating the information stream into the shared memory by a producer-side interface, the producer-side interface interfacing between the producer and the IPC channel;
        computer readable program code for notifying a consumer-side interface of arrival of the information stream via at least one of N mail slots, the consumer-side interface interfacing between the at least one of the N consumers and the IPC channel; and
        computer readable program code for receiving the information stream from the shared memory by the consumer-side interface.

22. The computer program product of claim 21 wherein the computer readable program code for generating the information stream comprises computer readable program code for specifying a number of buffers and a buffer size to be used in the shared memory.

23. The computer program product of claim 21 wherein the computer readable program code for generating the information stream comprises computer readable program code for allocating a buffer for writing.

24. The computer program product of claim 21 wherein the computer readable program code for notifying the arrival of the information stream comprises computer readable program code for broadcasting a notification to the N consumers.

25. The computer program product of claim 21 wherein the computer readable program code for receiving the information stream comprises computer readable program code for attaching the at least one of the N consumers to the IPC channel.

26. The computer program product of claim 21 wherein the computer readable program code for receiving the information stream comprises computer readable program code for waiting until a buffer is broadcast.

27. The computer program product of claim 21 wherein the computer readable program code for receiving the information stream comprises computer readable program code for mapping a buffer's address into an address space of the at least one of the N consumers.

28. The computer program product of claim 21 wherein the computer readable program code for receiving the information stream comprises computer readable program code for specifying a desired sample notification rate at which to be notified of a buffer arrival.

29. The computer program product of claim 21 wherein the computer readable program code for receiving the information stream comprises computer readable program code for specifying a key attribute of the information stream for matching before notification.

30. The computer program product of claim 21 wherein the computer readable program code for receiving the information stream comprises computer readable program code for releasing a reference to a buffer.

* * * * *